(12) United States Patent
Stoppe et al.

(10) Patent No.: US 10,330,913 B2
(45) Date of Patent: Jun. 25, 2019

(54) METHOD AND DEVICE FOR IMAGING AN OBJECT

(71) Applicant: Carl Zeiss Microscopy GmbH, Jena (DE)

(72) Inventors: Lars Stoppe, Jena (DE); Christoph Husemann, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 79 days.

(21) Appl. No.: 15/327,903

(22) PCT Filed: Jul. 20, 2015

(86) PCT No.: PCT/EP2015/066529
§ 371 (c)(1),
(2) Date: Jan. 20, 2017

(87) PCT Pub. No.: WO2016/012391
PCT Pub. Date: Jan. 28, 2016

(65) Prior Publication Data
US 2017/0205617 A1 Jul. 20, 2017

(30) Foreign Application Priority Data
Jul. 22, 2014 (DE) .................. 10 2014 110 302

(51) Int. Cl.
*G02B 21/06* (2006.01)
*G02B 21/36* (2006.01)
(Continued)

(52) U.S. Cl.
CPC ........... *G02B 21/367* (2013.01); *G02B 21/06* (2013.01); *G02B 27/58* (2013.01)

(58) Field of Classification Search
CPC ....... G02B 21/367; G02B 27/58; G02B 21/06
See application file for complete search history.

(56) References Cited

U.S. PATENT DOCUMENTS 9,864,184 B2 * 1/2018 Ou ...................... G02B 21/002
9,955,863 B2 * 5/2018 Frisken ............... A61B 3/0025
(Continued)

FOREIGN PATENT DOCUMENTS

| CN | 101903892 A | 12/2010 |
|---|---|---|
| CN | 102998789 A | 3/2013 |

(Continued)

OTHER PUBLICATIONS

Russ, John C., "Processing Images in Frequency Space", In: "The Image Processing Handbook, Sixth Edition" CRC Press, Jan. 1, 2011, 337-393.
(Continued)

*Primary Examiner* — Howard D Brown, Jr.
(74) *Attorney, Agent, or Firm* — Murphy, Bilak & Homiller, PLLC

(57) ABSTRACT

At least two images (201-1-201-3) of an object (100) are obtained, wherein each image has an illumination field (110-1-110-3) associated therewith, which is associated with predetermined beam shape properties (111-1-111-3). For each one of the at least two images (201-1-201-3) an effect of the beam shape properties is added to a predetermined approximation of the object, the approximation is adjusted by means of Fourier ptychography techniques on the basis of the respective image and then the effect of the beam shape properties is removed from the adapted approximation of the object.

12 Claims, 6 Drawing Sheets

(51) Int. Cl.
*G02B 27/58* (2006.01)
*H04N 9/07* (2006.01)

(56) References Cited

U.S. PATENT DOCUMENTS

| | | | |
|---|---|---|---|
| 2002/0159167 A1* | 10/2002 | Greenberg | G02B 5/005 359/738 |
| 2003/0179919 A1* | 9/2003 | Goldberg | G01N 21/8806 382/141 |
| 2014/0118529 A1* | 5/2014 | Zheng | G21K 7/00 348/80 |
| 2015/0034810 A1* | 2/2015 | Iketaki | G02B 21/0032 250/225 |
| 2015/0253560 A1 | 9/2015 | Otte et al. | |
| 2016/0327779 A1* | 11/2016 | Hillman | G02B 21/367 |
| 2016/0345820 A1* | 12/2016 | Frisken | A61B 3/0025 |
| 2017/0132782 A1* | 5/2017 | Matejka | G06T 7/0004 |
| 2017/0205617 A1* | 7/2017 | Stoppe | G02B 21/367 |
| 2017/0261741 A1* | 9/2017 | Stoppe | G02B 21/367 |
| 2017/0280039 A1* | 9/2017 | Stoppe | G06T 5/003 |

FOREIGN PATENT DOCUMENTS

| | | |
|---|---|---|
| CN | 103582839 A | 2/2014 |
| CN | 104885187 A | 9/2015 |

OTHER PUBLICATIONS

Zheng, Guoan et al., "Wide-field, high-resolution Fourier ptychographic microscopy", Nature Photonics vol. 7, No. 9, Jul. 28, 2013, 1-7.
Rodenburg, J.M., et al., "A Phase Retrieval Algorithm for Shifting Illumination", Applied Physics Letters, A I P Publishing LLC, vol. 85, No. 20, Nov. 15, 2004, pp. 4795-4797.

* cited by examiner

METHOD AND DEVICE FOR IMAGING AN OBJECT

TECHNICAL FIELD

Various aspects relate to a method for imaging an object using a microscopy device and a corresponding microscopy device. In particular, various aspects relate to techniques for taking account of beam shape properties of an illumination field when determining a result image.

BACKGROUND

In microscopic examinations of objects, a resolution which is as high as possible or a high space-bandwidth product and/or a high contrast is/are desirable for many applications. Techniques which allow a comparatively high-resolution result image to be obtained by combining a plurality of images with a comparatively low resolution in the spatial frequency space (k-space) are known. Fourier ptychography is such a technique; see G. Zheng et al., in Nature Photonics 7 (2013) 739-745. In this method, an object to be examined by microscopy is successively illuminated in a partially coherent manner under different illumination directions. For each illumination direction, the object illuminated thus is imaged and recorded using a microscope and the image captured thus is stored (image capture). A stack of images is obtained in this way, with each image having a different illumination direction assigned thereto and the images having a comparatively low resolution. A phase and amplitude distribution of the object is then calculated (image evaluation) using this stack of images by means of an iterative algorithm, for example an error reduction algorithm, a hybrid input-output algorithm and/or a Gerchberg-Saxton algorithm. Said distribution may be stored and depicted as a result image, which has a comparatively high resolution. Here, a spectrum of the object is reconstructed by the algorithm instead of the object itself, and so the phase and amplitude distribution of the object may be obtained by a further Fourier transform.

In a Fourier ptychography device used in the aforementioned publication by G. Zheng et al., the various illumination directions are realized by a matrix-shaped light-emitting diode array or a light-emitting diode (LED) array as an illumination device below the object, with a microscope then imaging the object in transmission. The working distance between the LED array and the object is selected in such a way in the process that each individual LED has a sufficiently high degree of coherence. The images may be captured with different illumination directions by switching on individual LEDs in sequence.

However, this procedure for illumination has various disadvantages. Thus, the illumination of the object only has restricted homogeneity in certain illumination directions, particularly if the illumination directions are very different. Strongly deflected illumination directions by LEDs at the edge of the LED array typically correspond to a greater distance between the LED and the object and therefore lead to a reduced light power. Moreover, an installation space required for such an LED array and a required distance between the LED array and the object are relatively large. Finally, such an illumination technique cannot be easily integrated into existing illumination concepts of conventional microscopes. In particular, it cannot be used as an additional module, by means of which it is possible to switch between conventional incoherent illumination and coherent illumination from various illumination directions.

In general, an imperfection of the illumination device—such as e.g. restricted coherence of the light, inhomogeneous illumination, only restricted selection of illumination directions, other aberrations of illumination fields, etc.—may have a negative effect on the quality of the result image when Fourier ptychography techniques are applied. However, it may often be necessary to accept such restrictions in the quality of the illumination device in order to obtain a practically implementable illumination device. Then, it may once again not be possible, or only possible to restricted extent, to use the conventional Fourier ptychography techniques for image evaluation purposes. In particular, a reduction in the result image quality may occur.

Therefore, there is a need for improved techniques for determining a result image on the basis of Fourier ptychography. In particular, there is a need for those techniques which facilitate a comparatively high quality of the result image, even in the case of imperfections in the illumination device. There is a need for those techniques for determining a result image on the basis of Fourier ptychography which facilitate reliable and good results when applied in very different microscopy devices. There is also a need for those techniques which facilitate a comparatively simple illumination device and/or an illumination device with little structural complexity in conjunction with Fourier ptychography techniques.

SUMMARY

This object is achieved by the features of the independent claims. The dependent claims define embodiments.

In accordance with one aspect, the application relates to a method for imaging an object using a microscopy device. The method comprises obtaining at least two images of the object. The at least two images of the object have a first resolution. An illumination field is assigned to the at least two images in each case, said illumination field illuminating the object during the image capture of the respective image. The respective illumination field is associated with predetermined beam shape properties. For each one of the at least two images, the method comprises the following step for image evaluation: adding an effect of the beam shape properties of the respectively assigned illumination field to a predetermined approximation of the object in the image space, wherein the approximation has a second resolution which is greater than the first resolution. The method furthermore comprises the following step for image evaluation for each one of the at least two images: adapting the approximation in k-space by means of Fourier ptychography techniques on the basis of the respective captured image. The method furthermore comprises the following step for image evaluation for each one of the at least two images: removing the effect of the beam shape properties of the respective illumination field from the adapted approximation of the object in the image space in order to obtain an intermediate image. The method furthermore comprises determining a result image on the basis of the intermediate images which are assigned to the at least two illumination fields.

By way of example, it would be possible for the method furthermore to comprise the following for each one of the at least two images: illuminating the object with the respective illumination field by operating an illumination device of the microscopy device and capturing the respective image of the object during the illumination with the respective illumination field using a detector of the microscopy device. Thus, the method may furthermore comprise image-capturing steps. However, it would also be possible for the image evaluation to be carried out e.g. following a relatively large time interval after the image capture.

By way of example, adapting the approximation may furthermore comprise: propagating the approximation from the image space into the k-space. Adapting the approximation may furthermore comprise: propagating the adapted approximation back from the k-space into the image space. By way of example, the (back) propagation between image space and k-space may be carried out by means of Fourier transform or inverse Fourier transform techniques.

In general, the beam shape properties of the illumination fields need not be subject to particular restrictions. The beam shape properties of the illumination fields may describe a set of parameters which are suitable for setting the illumination field. Typically, this comprises the following, without being restricted thereto: a spatially dependent amplitude and/or phase of the illumination field; and/or a shape of the aperture of an illumination device of the microscopy device; and/or an illumination direction in respect of the object; and/or an astigmatism; and/or a curvature; and/or a distortion.

The addition or removal of the beam shape properties may be carried out in different ways. In particular, a way of adding or removing may depend on a type of notation or representation of the illumination field, e.g. in a memory of the microscopy device. By way of example, in one implementation, the addition of the beam shape properties may correspond to a complex-valued multiplication of the illumination field with the approximation. Correspondingly, it would be possible for the removal of the beam shape properties to correspond to a complex-valued division of the illumination field by the approximation. Other arithmetic operations, e.g. adding, subtracting, convolving, etc., are also conceivable.

Various effects may be obtained by taking into account the beam shape properties of the respective illumination fields assigned to the at least two images. An option for diversifying the illumination fields may be provided by changing very different beam shape properties, in particular not only the illumination direction. As a result, it may be possible, for example, to obtain a particularly pronounced diversification by changing a plurality of beam shape properties and hence determine a particularly high quality result image in the case of the same number of images; it would also be possible to take into account a particularly large number of images since a parameter space of the beam shape properties, within which the beam shape properties may be varied, is particularly large. This may also increase the quality of the result image. Expressed differently, it may be possible to increase the quality of the result image by targeted selection and manipulation of beam shape properties. Here, comparatively many degrees of freedom are available for selection and manipulation; the parameter space is correspondingly large.

As a further effect, it may be possible to take into account specific predetermined restrictions or boundary conditions in the parameter space of the beam shape properties—e.g. non-implementable illumination directions and/or technology-caused aberrations—and to reduce the unwanted influence thereof on the result image. Expressed differently, it may be possible to take into account specific predetermined boundary conditions of the illumination fields and nevertheless determine a high quality result image. Thus,—e.g. in addition to the requirement that the illumination fields completely illuminate the object—the illumination fields may be variable in respect of very different beam shape properties; furthermore, specific restrictions, such as e.g. a necessary inhomogeneous illumination, may be tolerable.

By way of example, such restrictions may be predetermined structurally and/or technically by the employed microscopy device or the employed illumination device. By way of example, it may be possible by means of the above-described techniques to also take into account those situations in which the illumination fields do not correspond to a plane wave. In particular, this allows the use of microscopy devices using a comparatively small distance between an illumination source and the object. In this case, it may also be unnecessary to use a particularly well corrected illumination device, e.g. for high-aperture illuminations, as a result of using particularly many and/or high-quality optical elements. Expressed differently, it may be possible to ensure a comparatively high quality of the result image with very different microscopy devices, which need not meet any increased technical requirements. In particular, it may be possible to achieve a comparatively simpler realization of the microscopy device since there is no need to generate plane illumination waves. By way of example, this may facilitate a more cost-effective, less error-prone, more robust and/or more space-saving implementation of the microscopy device and, in particular, of the associated illumination device.

By way of example, the predetermined approximation may be stored in a memory. It would also be possible for the predetermined approximation to be determined by a user. Alternatively, or additionally, the predetermined approximation may also be determined on the basis of a reference image. It is possible for the result image and/or the intermediate images to also have the second resolution.

Then, the method may comprise the iterative adaptation of the approximation on the basis of the at least two images. Thus, the predetermined approximation which is used for the image evaluation of a first image of the object may correspond to the intermediate image which is obtained by the image evaluation of a second image of the object. Expressed differently, the output of the image evaluation for the first image may thus correspond to the input into the image evaluation for the second image. It is possible for the approximation of the object to thus be propagated by the image evaluation for all of the at least two images and thus be improved iteratively, i.e. be brought into greater correspondence with an actual image of the object.

The image evaluation may also be repeated a number of times, for example for all of the at least two images; this may be quantified by a corresponding counter. Here, the image evaluation may be carried out sequentially for the at least two images in a fixed sequence, or else in a variable sequence which, for example, is different for various iterations. By way of example, it may be possible to repeat the steps for the image evaluation for the at least two images until a predetermined convergence criterion is satisfied. By way of example, the predetermined convergence criterion may relate to the intermediate images. The convergence criterion may be selected from, for example, the following group: change in the intermediate images being less than a predetermined threshold; counter of the repetitions exceeding predetermined threshold. By way of example, the predetermined threshold for the counter may be two or three or fifty or one hundred. It is possible to increase a quality of the result image by repeatedly repeating the image evaluation for the at least two images. The changes in the intermediate images may, for example, be considered on a pixel-by-pixel basis and/or be considered on an averaged basis over the entire intermediate image in each case.

In general, a person skilled in the art is aware of the Fourier ptychography techniques, for example from the article by G. Zheng et al., set forth at the outset. For the purposes of implementing the techniques described in the present case, it is not necessary for all the various steps of the methodology described by G. Zheng to be carried out here. In general, the Fourier ptychography techniques may replace pixel values of the approximation in a specific region by pixel values of the captured image of the object. By way of example, the specific region corresponds to a system pupil of the respective illumination field. The shape of the system pupil may typically depend on a shape of an aperture of an illumination device of the microscopy device. The position of the system pupil in k-space may typically depend on an illumination angle of the respective illumination field. By way of example, the illumination angle may be quantified in relation to an optical axis of the microscopy device.

Thus, techniques which facilitate a determination of the result image on the basis of Fourier ptychography techniques while simultaneously taking account of beam shape properties of the respective illumination field were illustrated above. These techniques may also be referred to as a development of the Gerchberg-Saxton algorithm. In particular,—for example compared to the technique according to G. Zheng—there is a reconstruction of the object by image evaluation in the image space—and not in the k-space. This is because the effect of the beam shape properties is respectively added to or removed from the approximation in the image space. That is to say, the intermediate images are propagated in the image space. This may facilitate particularly comprehensive and particularly exact consideration of the beam shape properties which, in turn, may be reflected in an increased quality of the result image. In particular, it may be possible to take account of the beam shape properties in a manner that is comparatively not very computationally intensive. This is the case as the beam shape properties or the effect thereof are typically predetermined in the image space and, for example, a conversion into the k-space is unnecessary.

In general, various different beam shape properties may be taken into account. By way of example, it would be possible for the spatially dependent amplitude of the illumination field to be described by a Gaussian function. Alternatively, or additionally, it would also be possible for the spatially dependent amplitude of the illumination field to be predetermined by a non-Köhler illumination device of the microscopy device and/or by the illumination device of the microscopy device with critical illumination. In the case of critical illumination, a collector may image, for example, the image of the light source into a preparation plane. In particular, it may therefore be unnecessary for the spatially dependent amplitude of the illumination field to be substantially constant in the region of the object (homogeneous illumination). It may also be unnecessary for a phase of the illumination field to be substantially constant in the region of the object. In particular, it is also possible to use illumination devices which do not provide planar plane waves and do not provide a homogeneous illumination of the object. What may be achieved thereby is that the microscopy device makes do with fewer optical elements and may thus be provided in a more cost-effective and robust manner. At the same time, it may be possible that the microscopy device requires less installation space and may be produced to be smaller. Further, it may be more easily possible to provide the illumination device as an additional module for different microscopy devices.

It would also be possible for the shape of the aperture to be predetermined by a zoom device of the microscopy device for the at least two illumination fields. By way of example, it may be possible by means of the zoom device to set the shape of the aperture in a targeted manner. In this way, it may be possible to modify the beam shape properties for different ones of the at least two images in a targeted manner by modifying the shape of the aperture. In particular, it may be possible to change the shape of the aperture—for example instead of, or in addition to, various illumination directions—and thus increase an accessible parameter space of the beam shape properties. In particular, this may increase a quality of the result image.

By way of example, the shape of the aperture could be predetermined dependent on illumination directions of the at least two illumination fields. Thus, it may be possible for the system pupils of in each case two of the at least two illumination fields to alternately overlap, for example in an overlap region. In particular, having the various system pupils or k-space fields overlap respectively in a pairwise manner may be worth pursuing. In any case, an overlap may be present numerically in the k-space. In such a case, it may be possible that the convergence criterion is reached as soon as possible, as a result of which computational capacities may be reduced and the quality of the image result may be increased.

In particular, it is possible that at least some or all of the at least two illumination fields are associated with the same illumination directions which include a finite angle with the optical axis of the microscopy device. Expressed differently, it may be possible that there is an illumination of the object from the same illumination directions, for example for one or more of the at least two illumination fields; at the same time, it would be possible for further beam shape properties for the illumination to be varied with the illumination fields with the same illumination direction.

Generally, knowing the various beam shape properties or the effect thereof on the approximation may be worth pursuing in accordance with the techniques described above. By way of example, it would be possible in a simple implementation for the various beam shape properties for the at least two illumination fields to be fixedly predetermined and for an effect of the beam shape properties to be stored, for example in a memory of the microscopy device. However, it would also be possible for the beam shape properties to be determined dynamically. By way of example, it may be possible that the method furthermore comprises: carrying out a calibration sequence for determining the beam shape properties of the at least two illumination fields. By way of example, a calibration image may be captured within the scope of the calibration sequence without an object being situated in the beam path of the microscopy device. Alternatively, or additionally, it would also be possible for a calibration image to be captured within the scope of the calibration sequence, with a calibration object known in advance being situated in the beam path of the microscopy device during the capture. By way of example, the calibration object may be a phase grating. The latter may have a specific periodicity. By way of example, the calibration object may be illuminated by monochromatic light with a predetermined wavelength.

In accordance with a further aspect, the present application relates to a microscopy device configured to image an object. The microscopy device comprises a computer unit configured to obtain at least two images of the object. The at least two images have a first resolution. An illumination field is assigned to the at least two images in each case, said illumination field illuminating the object during the image capture of the respective image and being associated with predetermined beam shape properties. The computer unit is furthermore configured to carry out the following steps for image evaluation for each one of the at least two images: adding an effect of the beam shape properties of the respectively assigned illumination field to a predetermined approximation of the object in the image space, wherein the approximation has a second resolution which is greater than the first resolution; and adapting the approximation by means of Fourier ptychography techniques on the basis of the respective captured image; and removing the effect of the beam shape properties of the respective illumination field from the adapted approximation of the object in the image space in order to obtain an intermediate image. The computer unit is furthermore configured to determine a result image on the basis of the intermediate images which are assigned to the at least two illumination fields.

By way of example, the microscopy device in accordance with the currently discussed aspect may be configured to carry out the method for imaging an object in accordance with a further aspect.

It is possible to obtain effects for such a microscopy device in accordance with the currently discussed aspect which are comparable to the effects which may be obtained for the method for imaging an object in accordance with a further aspect.

The features presented above and features which are described below may be used not only in the corresponding explicitly presented combinations, but also in further combinations or on their own without departing from the scope of protection of the present invention.

BRIEF DESCRIPTION OF THE DRAWINGS

The above-described properties, features and advantages of this invention, and the manner in which they are achieved, become clearer and more easily understandable in conjunction with the following description of the exemplary embodiments, which are explained in more detail in conjunction with the drawings.

DETAILED DESCRIPTION

Figure 1:
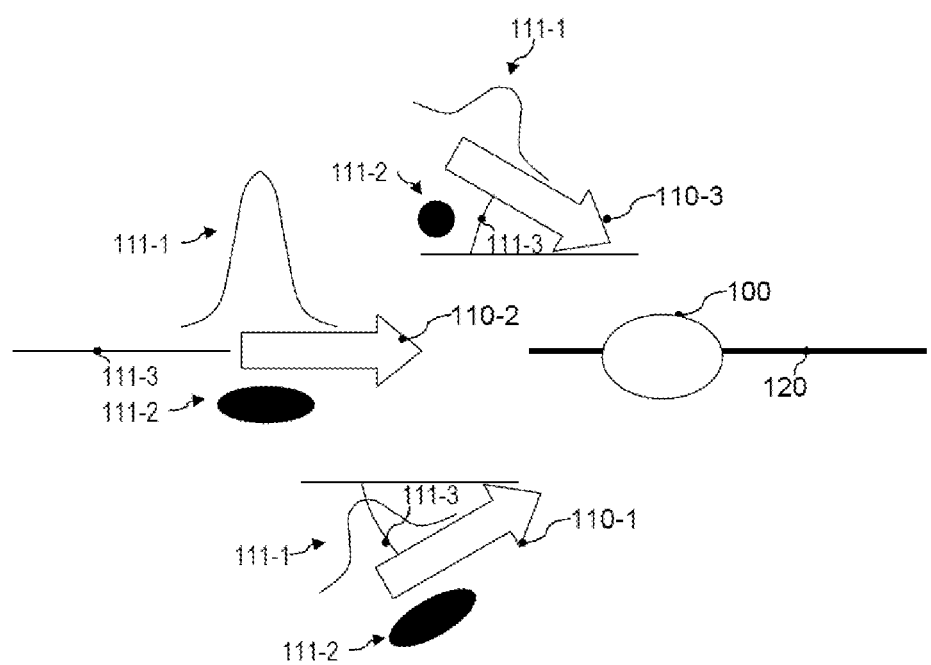
FIG. 1 schematically illustrates three illumination fields and associated beam shape properties.

Below, the present invention is explained in more detail on the basis of preferred embodiments, with reference being made to the drawings. In the figures, the same reference signs denote the same or similar elements. The figures are schematic representations of various embodiments of the invention. Elements depicted in the figures are not necessarily depicted true to scale. Rather, the various elements depicted in the figures are reproduced in such a way that the function and general purpose thereof is rendered comprehensible to a person skilled in the art. Connections and couplings between functional units and elements depicted in the figures may also be implemented as an indirect connection or coupling. A connection or coupling may be implemented in a wired or wireless manner. Functional units may be implemented as hardware, software or a combination of hardware and software.

Techniques facilitating determination of a high-resolution result image on the basis of images with a low resolution are described below. Here, Fourier ptychography techniques are applied. In particular, beam shape properties of illumination fields used to illuminate the object when capturing the images are taken into account. Here, the described techniques exploit the fact that—in addition to various illumination directions as in the case of conventional Fourier photography—various further beam shape properties may be taken into account for diversifying the illumination fields.

In particular, two obtainable effects are conceivable when taking into account the beam shape properties. Firstly: aberration correction. Here, the object may be illuminated from different illumination directions with the aid of an illumination device of the corresponding microscopy device. Typically, such an illumination of the object is afflicted by aberrations. By way of example, the object may be illuminated not by ideal plane waves but by different beam shapes from different illumination directions. By way of example, illumination aberrations may arise if plane LED arrays or a plane displacement device of a pinhole is attached in curved illumination pupils. Such aberrations or other aberrations may be taken into account in the techniques described here and the effect thereof may be reduced retrospectively, in particular by suitable image evaluation. In addition to aberrations in the illumination, the techniques described herein may also take into account aberrations of a detection optical unit of the microscopy device. The effect thereof may also be reduced within the scope of an image evaluation. Secondly: diversification of the modified beam shape properties. In particular, it may be possible by means of the techniques described herein to achieve diversification of the varied beam shape properties not only by way of different illumination directions but, alternatively or additionally, also by generally variable beam shaping of the illumination fields. Here, the beam shaping may be carried out in various ways. By way of example, it may be possible to extend or compress a detected frequency space using a zoom system of the illumination device. By way of example, it would be possible to carry out a determination of the result image purely on the basis of such a variation of the parameter of the detected frequency space or the employed aperture. However, such a variation of the beam shape properties may also, for example, be combined with various illumination directions, for example by virtue of use being made of one or two tilt mirrors or a displaceable pinhole in the illumination device. Naturally, it is also possible to use an illumination device on the basis of an LED array in accordance with the publication by G. Zheng set forth at the outset. However, it is possible to reduce a number of the required illumination directions for a specific quality of the result image to be achieved in this case here—as a result of the additional enlargement of a parameter space of the beam shape properties. Thus,—as an alternative or in addition to the aforementioned correction of aberrations—the techniques described herein also facilitate the use of very different microscopy devices with very different degrees of freedom of beam shape properties.

FIG. 1 depicts three illumination fields 110-1, 110-2, 110-3 on the basis of arrows. The illumination fields 110-1-110-3 illuminate an object 100. The three illumination fields 110-1-110-3 have different illumination directions 111-3, which is depicted in FIG. 1 by angles in relation to the axis 120 along which a light beam from the illumination device to the detector does not experience any deflection or any significant deflection (optical axis). What may be gathered from FIG. 1 is that the first illumination field 110-1 and the third illumination field 110-3 include a finite angle with the optical axis 120. The second illumination field 110-1 is oriented parallel to the optical axis 120. Further, the three illumination fields 110-1-110-3 have a different aperture 111-2. By way of example, the first illumination field 110-1 has an ellipsoidal aperture 111-2. The second illumination field 110-2 also has an ellipsoidal aperture 111-2. The third illumination field 110-3 has a circular aperture 111-2, which also has a larger numerical aperture (NA). By way of example, such different forms of the aperture may be set variably for the various illumination fields 110-1-110-3 by a zoom device of the microscopy device. What may further be gathered from FIG. 1 is that the three illumination fields 110-1-110-3 have an amplitude 111-1 with different spatial dependencies. The amplitudes 111-1 of the three illumination fields 110-1-110-3 are Gaussian. The maximum value of the amplitude 111-1 is greater (smaller) for the second illumination field 110-2 (for the first illumination field 110-1 and the third illumination field 110-3). The spatial dependence of the amplitude 111-1 causes the object 100 to be illuminated in the entirety thereof, i.e. the amplitude assumes finite values in the region of the object 100; however, the amplitude varies and so the object 100 is illuminated inhomogeneously. By way of example, a full width at half maximum of the Gaussian spatial dependence would be a further parameter of the spatial dependence of the amplitude 111-1 which could be adapted within the scope of the beam shape properties 111-1-111-3 of the illumination fields 110-1-110-3. It would also be possible within the scope of the beam shape properties 111-1-111-3 to vary a spatial dependence of a phase of the respective illumination fields 110-1-110-3, for example to implement a specific change in the phase over position and hence non-plane illumination waves. By way of example, such a spatially dependent amplitude 111-1 and/or spatially dependent phase of the illumination field 110-1-110-3 may be implemented by a non-Köhler illumination device and/or by an illumination device with critical illumination. Further beam shape properties 111-1-111-3 which may be taken into account would include, for example, an astigmatism, a curvature or a distortion of the illumination fields 110-1-110-3.

Knowing as many as possible of the various beam shape properties 111-1-111-3 of the illumination fields 110-1-110-3, for example in particular being able to quantify these, may be worth pursuing for the purposes of carrying out the techniques described in detail below. By way of example, it may be possible for the various beam shape properties 111-1-111-3 to be stored in a corresponding memory of the microscopy device and be able to be retrieved therefrom. Then, it is possible to program the various beam shape properties 111-1-111-3 e.g. once, for example depending on the specific construction and equipment of the microscopy device. However, it would also be possible for the various beam shape properties 111-1-111-3 to be determined within the scope of a calibration sequence, for example just before the image capture. As a result of this, it is also possible to take account of dynamic aspects, e.g. drifts, etc.

Figure 2:
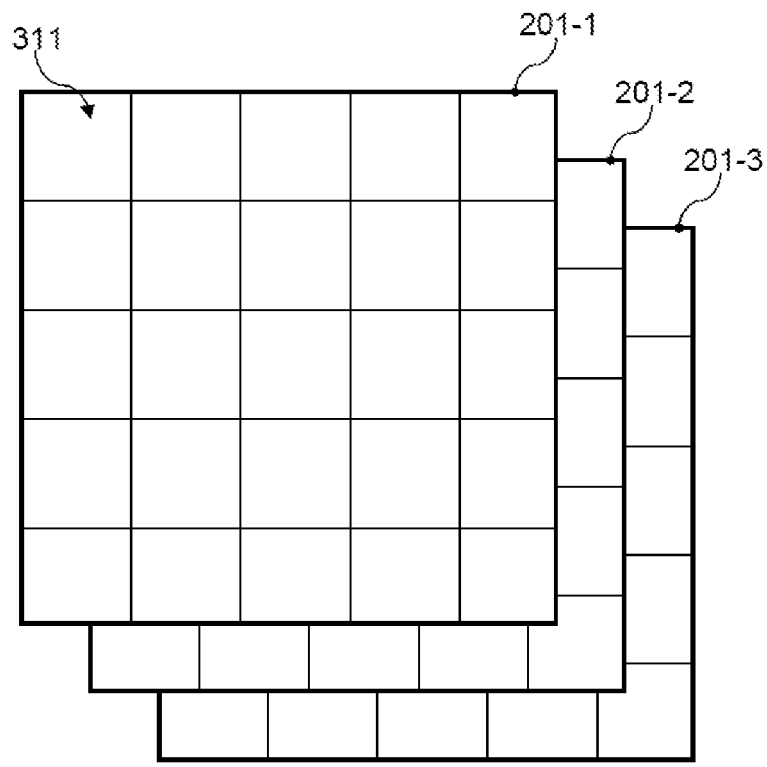
FIG. 2 shows a stack of images which are obtained by illuminating an object with the three illumination fields, the three images having a first resolution.
Figure 3:
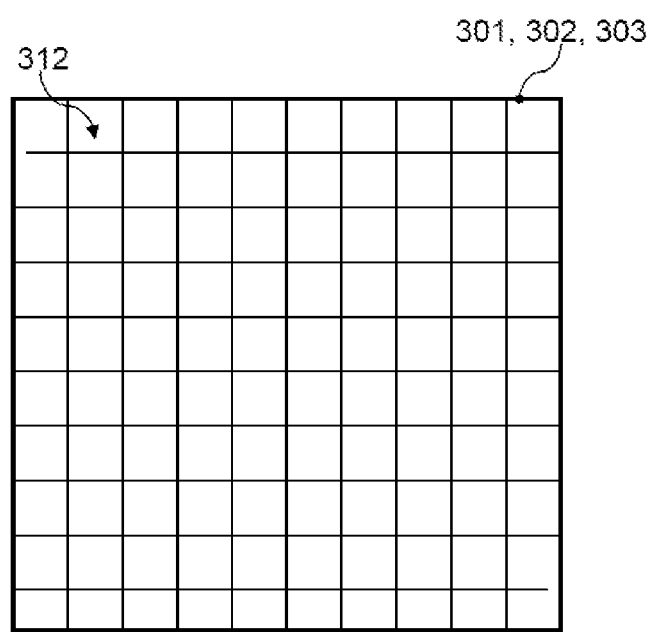
FIG. 3 shows a result image which is determined on the basis of Fourier ptychography techniques and on the basis of the images, the result image having a second resolution which is greater than the first resolution.

It is then possible to illuminate the object 100 with the three illumination fields 110-1-110-3 within the scope of an image capture. A corresponding image 201-1-201-3, as depicted in FIG. 2, may be captured for each one of the illumination fields 110-1-110-3. By way of example, the images 201-1-201-3 may be intensity images. By way of example, the first image 201-1 may be captured for the first illumination field 110-1 and the second image 201-2 may be captured for the second illumination field 110-2 and the third image 201-3 may be captured for the third illumination field 110-3. The three images 201-1-201-3 have a first resolution 311. The goal of the techniques described below is to provide a result image 303 having a second resolution 312 that is greater than the first resolution 311 (cf. FIGS. 2 and 3). Here, the techniques are based on an approximation 301 initially being predetermined, said approximation then being adapted iteratively, as a result of which intermediate images 302 are obtained. The approximation 301 and the intermediate images 302 also have the second resolution 312.

Figure 4:
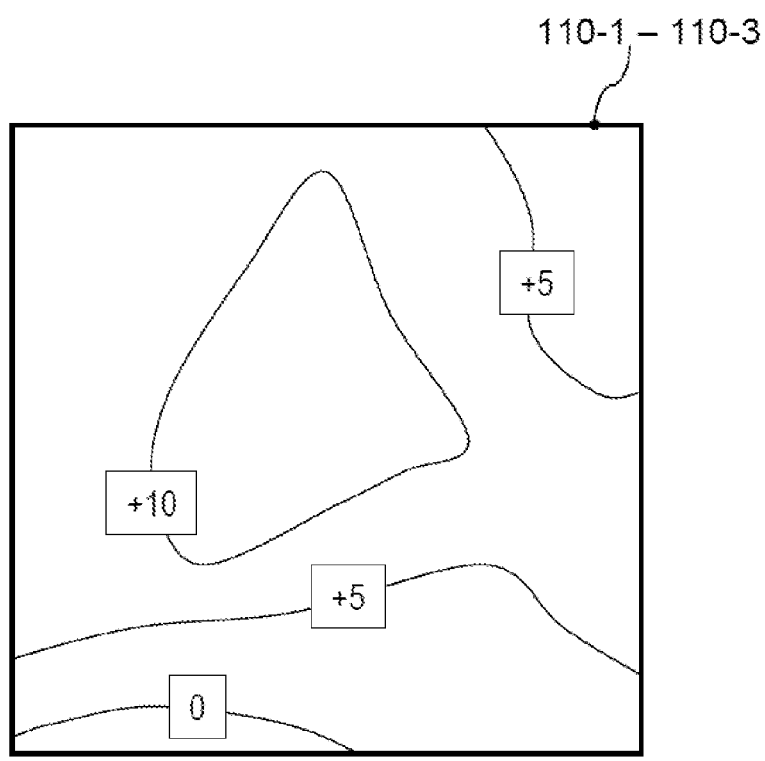
FIG. 4 illustrates, in the form of an iso-contour plot, a spatially dependent amplitude of one of the illumination fields in detail.

The techniques are typically based on an effect of the beam shape properties 111-1-111-3 of the various illumination fields 110-1-110-3 being added to or removed from the approximations 301 or intermediate images 302 corresponding to the respectively different images 201-1-201-3. This occurs in the image space. To this end, quantifying the respective illumination field 110-1-110-3 determined by the beam shape properties 111-1-111-3 and having these available in a format which permits simple addition or removal of the corresponding effect may be worth pursuing. By way of example, the respective illumination field 110-1-110-3 may be present as a two-dimensional amplitude map or phase map or aberration map, etc.—as shown in FIG. 4. Then, an effect of the respective illumination field 110-1-110-3 may be added to (removed from) the corresponding approximation 301 or intermediate field 302 in the position space e.g. by multiplication (division).

Fourier ptychography techniques may be applied between the addition and removal of the effect of the respective illumination field 110-1-110-3. In particular, these Fourier ptychography techniques may replace pixel values of the approximation 301 in a specific region by pixel values of the respective image 201-1-201-3. Stated more generally, the approximation 301 may be improved on the basis of the respective image 201-1-201-3. The determined region may correspond to a system pupil in k-space. Here, the system pupil may correspond to a conjugate plane of the object. Moreover, the system pupil may correspond to a plane of an intermediate image of a light source in some exemplary embodiments. In other exemplary embodiments, the system pupil may moreover correspond to a conjugate plane of the light source. To this end, reference is made, furthermore, to the publication by G. Zheng set forth at the outset, where system pupils are indicated by dashed circles, respectively for the illumination directions with angles 0°, 0°; −22°, −19'; and −22°; −22° in FIG. 1, lower column, central three insets therein.

As may be gathered further from this figure by G. Zheng, the parameter space of the beam shape properties is merely defined by various illumination directions in accordance with the technique by G. Zheng. In particular, no variable dimensions and/or forms of system pupils, for example, are possible; nor is it possible to take aberrations into account. In accordance with the present techniques, it would be possible, for example, to predetermine the shape of the aperture depending on illumination directions of the at least two illumination fields 110-1-110-3 in such a way that the system pupils of in each case two of the at least two illumination fields alternately overlap in an overlap region. Here, overlap may mean at least a numerical overlap. By way of example, it may namely be possible in accordance with the present techniques to undertake, in the position space, a corresponding distortion of the spectrum of the approximation 301 by the addition and removal of the effect of the beam shape properties 111-1-111-3, i.e., in particular, the shape of the aperture—instead of undertaking a distortion of the shape of the aperture which is circular in k-space. Expressed differently,—with reference to FIG. 1 in the publication of G. Zheng discussed above—it is possible to distort the underlying spectrum instead of the geometric shape of the system pupil. Thus, in this manner, it is possible, for example, to undertake an illumination with focusing rays for extending the detection NA. By way of example, rays are diffracted into the aperture for individual illumination positions, which rays would not fit through the detection NA in the case of an illumination with a plane wave.

Figure 5:
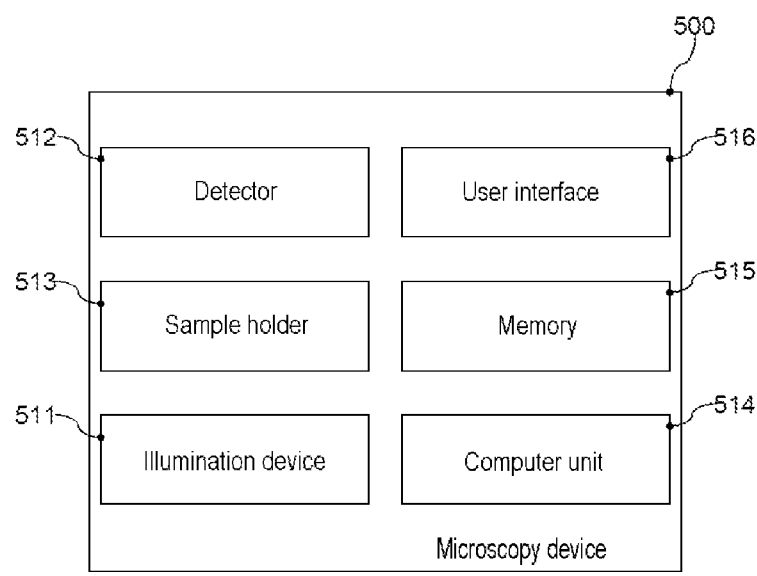
FIG. 5 shows a microscopy device which comprises an illumination device.

FIG. 5 depicts a microscopy device 500. The microscopy device 500 comprises the illumination device 511 and the detector 512. In principle, use may be made of very different illumination devices 511 for the purposes of illuminating the object 100. In particular, it is possible to use illumination devices 511 which facilitate illuminating the object 100 from very different illumination directions 111-3. By way of example, use may be made of e.g. a scanning mirror, for example in a field stop plane of the illumination device 511. It would also be possible to use an adaptive component in an aperture or illumination pupil of the illumination apparatus; by way of example, it would be possible to use the illumination device 511 in accordance with German patent application 10 2014 101 219.4. It would also be possible for the illumination device 511 to comprise an LED array.

The beam path of the light rays is defined between the illumination device 511 and the detector 512. A sample holder 513 which may be used to affix the object 100 is situated in the beam path. Further, the microscopy device 500 comprises a computer unit 514 and a memory 515. By way of example, the memory 515 may be a volatile or nonvolatile memory. Control statements may be stored in the memory 515; these may be used by the computer unit 514 to carry out the above-described techniques for determining the result image. In particular, such techniques may comprise: determining and/or retrieving the beam shape properties 111-1-111-3; adding and removing an effect of the beam shape properties 111-1-111-3 to and from the approximation 301; applying Fourier ptychography techniques in the k-space for adapting the approximation 301; determining the result image 303 on the basis of the intermediate images 302; Fourier transform and inverse Fourier transform, etc. While the microscopy device 500 is shown as a unit in FIG. 5, it would be possible, in general, for e.g. the memory 515 and/or the computer unit 514 to form separate elements in relation to the optical elements 511-513. The microscopy device 500 furthermore comprises a user interface 516 configured to receive user inputs and/or provide user outputs to a user. By way of example, the user interface 516 may comprise elements selected from the following group: a keyboard, a mouse, a monitor, speech input/output, etc.

Figure 6:
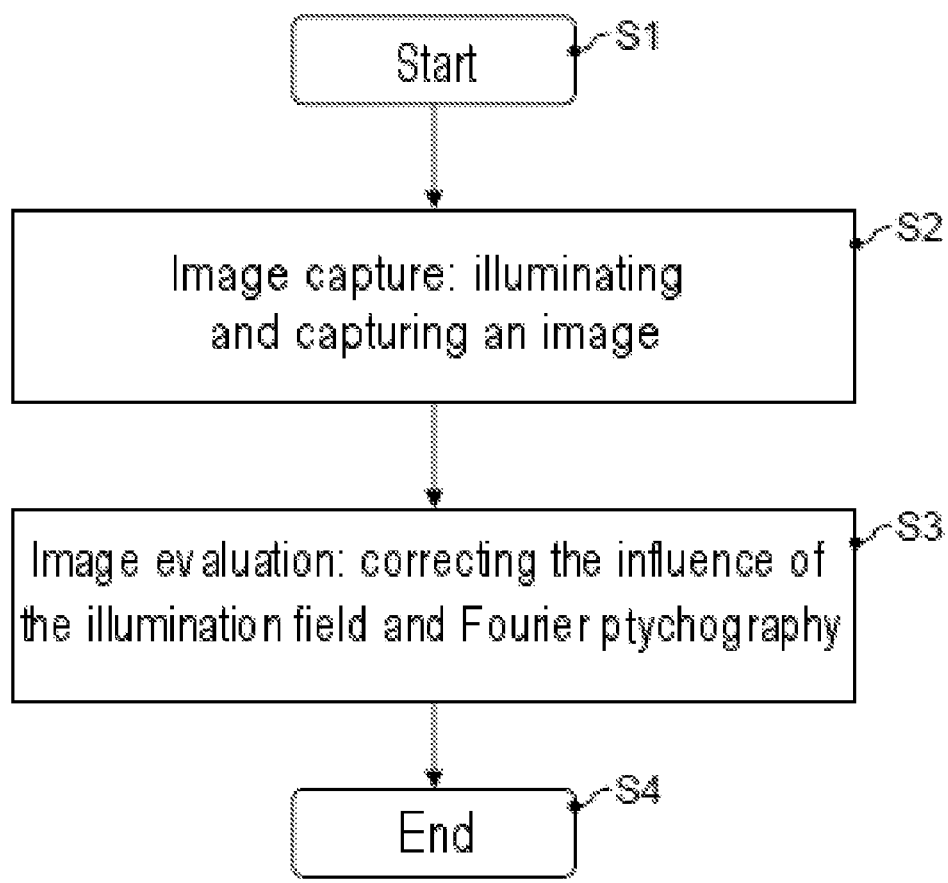
FIG. 6 is a flowchart of a method for determining the result image.

It may be possible to carry out the method in accordance with FIG. 6 by means of the microscopy device 500. The method begins in step S1. Firstly, the image is captured in step S2. Here, the object 100 is illuminated by the various illumination fields 110-1-110-3 by virtue of operating an illumination device 511 of the microscopy device 500. At the same time, the respective image 201-1-201-3 of the object 100 may be captured by the detector 512 of the microscopy device 500 while there is illumination by means of the respective illumination field 110-1-110-3. In step S2, it would furthermore be possible, optionally, to carry out the calibration sequence for determining the beam shape properties 111-1-111-3, for example prior to capturing the images 201-1-201-3.

Then, the image evaluation takes place in step S3. Within the scope of the image evaluation in step S3, the effect of the beam shape properties 111-1-111-3 of the respectively assigned illumination field 101-1-101-3 is added to the respective predetermined approximation 301 for each image 201-1-201-3 captured in step S2. Then, the approximation 301 is adapted in k-space on the basis of the respective image 201-1-201-3 by means of Fourier ptychography techniques. Subsequently, the effect of the beam shape properties 111-1-111-3 of the respective illumination field 101-1-101-3 is removed from the adapted approximation 301 of the object 100 in the image space and the intermediate image 302 is obtained. The intermediate image 302 may form the predetermined approximation 301 of the image evaluation for the next image 201-1-201-3. In step S3, it is possible to repeat the steps for image evaluation for the various images 201-1-201-3 until a predetermined convergence criterion for the intermediate images 302 is satisfied. By way of example, the convergence criterion could be a change between the various intermediate images 302 which is less than a predetermined threshold; accordingly, the convergence criterion could relate to a predetermined number of run-throughs of the various steps of the image evaluation for the various images 201-1-201-3.

Figure 7:
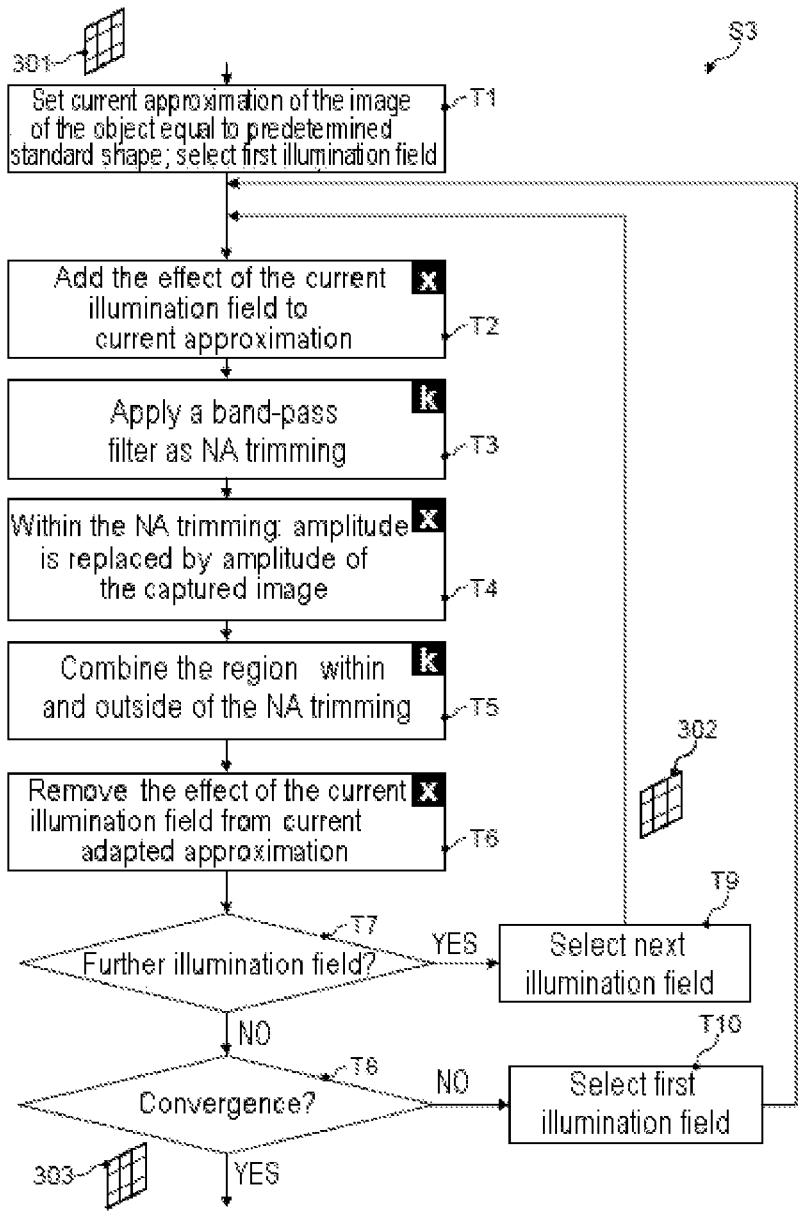
FIG. 7 is a flowchart which illustrates steps of the image evaluation in accordance with the method according to FIG. 6 in greater detail.

In particular, the various aforementioned steps of the image evaluation may be carried out iteratively. This is illustrated in FIG. 7. In particular, FIG. 7 thus describes step S3 in more detail. Initially, a predetermined standard shape of the object 100 is selected as predetermined approximation 301 in step T1. The approximation therefore corresponds to an estimate of the object 100. By way of example, the approximation 301 may be stored in the memory 515 and/or be obtained by way of the user interface 516. A current illumination field 110-1-110-3 is selected from the set of illumination fields 110-1-110-3. This corresponds to the selection of one of the images 201-1-201-3, said image having been captured for the respective illumination field 110-1-110-3 in step S2.

Then, an effect of the current illumination field 110-1-110-3 is added to the current approximation 301 in step T2, for example by complex-valued multiplication of a phase/amplitude map. This is carried out in the image space (illustrated in FIG. 7 by the white x on a black background).

The current approximation 301 adapted thus is then propagated into the k-space since step T3 operates in the k-space (illustrated in FIG. 7 by the white k on a black background). By way of example, the propagation into the k-space may be carried out by means of a Fast Fourier Transform (FFT) technique. This corresponds to a transformation into the system pupil as a conjugate plane of the microscopy device 500. NA trimming is then carried out in step T3. To this end, a band-pass filter is applied. By way of example, the band-pass filter may be a high-pass filter. Typically, NA trimming corresponds to cutting out of a circular region, wherein the position of this circular region may be predetermined by the respective illumination direction 111-3 of the respective illumination field 110-1-110-3. The region may be circular, particularly if a shape and/or dimension of the employed aperture of the illumination device is already taken into account in step T2—for example by a corresponding distortion of the approximation 301. In principle, there need be no change in the region outside of the NA trimming in step T4. However, it would also be possible, for example, to suppress noise or apply other operators to this region for the purposes of improving the image quality.

The part of the spectrum of the approximation 301 which lies within the region, i.e. which lies within the NA trimming, is then processed further in step T4. To this end, this part is initially propagated back into the focus of the microscopy device 500, i.e. transferred into the image space. Then, the amplitude of this part is replaced by the amplitude of the respective image 201-1-201-3. The amplitude typically corresponds to the root of the intensity. Thus, in this respect, the current approximation 301 may be adapted on the basis of the corresponding image 201-1-201-3.

Then, this adapted part is propagated back into the k-space or the system pupil again and the two regions within the NA trimming—modified in step T4—and outside of the NA trimming, as obtained from step T3,—are combined in step T5. This combination may be carried out in a manner suitable for the filter, i.e. depending on the band-pass filter selected in step T3.

Then, the approximation 301 adapted thus is propagated back into the image space, i.e. propagated back, back onto the object plane, for example by means of an inverse FFT. There, in step T6, the effect of the respective illumination field 110-1-110-3 then is removed, for example by complex-valued division. As a result, the intermediate image 302 is obtained.

In step T7, a check is carried out as to whether a further illumination field 110-1-110-3 is present, i.e. whether a further image 201-1-201-3 needs to be taken into account in order to improve the estimate of the object 100. If this is the case, the next illumination field 110-1-110-3 is selected in step T9. Furthermore, the intermediate image 302 from step T6 is selected as current approximation 301 of the then current image 201-1-201-3 for the purposes of carrying out steps T2-T6. Expressed differently, the output of carrying out steps T2-T7 for a first image 201-1-201-3 corresponds to the input for carrying out steps T2-T7 for a second image 201-1-201-3. The predetermined approximation 301 used for the image evaluation of the second image 201-1-201-3 corresponds to the intermediate image 302 which is obtained by the image evaluation of the first image 201-1-201-3.

Steps T2-T7 are then continued until it is determined in step T8 that no further illumination fields 110-1-110-3 are present anymore. Expressed differently, steps T2-T7 are carried out until the approximation 301 was adapted on the basis of all images 201-1-201-3 in step T4.

As soon as this is the case, a check is carried out in step T8 as to whether a predetermined convergence criterion is satisfied. By way of example, a simple convergence criterion could be: checking how frequently step T10 was carried out. Typically, the adaptation of the approximation 301 may be carried out e.g. a number of times on the basis of the various images 201-1-201-3, for example twice, three times or fifty times or one hundred times or even more frequently. Thus, expressed differently, each image 201-1-201-3 may be used a number of times for adapting the approximation 301. A further convergence criterion which may be checked in step T8 would be, for example, the extent to which the current approximation 301 changes between various iterations of carrying out steps T2-T7. If the convergence criterion in step T8 has not been satisfied, the first illumination field 110-1-110-3 is once again selected as the current illumination field in step T10 and steps T2-T7 and T9 are carried out again.

Otherwise, the current approximation 301 or the intermediate images 302 obtained last from step T6 may be determined as the result image 303. Thus, in such a case, each intermediate image 302 was propagated further into the next loop T2-T6 and was modified on the basis of the next image 201-1-201-3; therefore, the result image 303 is based on the intermediate images 302 of all images 201-1-201-3.

In the techniques described above, the aberrations in respect of steps T2 and T6 are taken into account. It would also be possible in a supplementary manner to take account of aberrations of the imaging microscopy device 500 during the propagation between image space and k-space between steps T3 and T4 and steps T4 and T5.

The above techniques thus allow a reconstruction of an image of the object 100 in the image space—as is apparent from FIG. 7, in step 19 the intermediate image 302 in each case is propagated further between iterations for various images 201-1-201-3. This permits the aberrations in steps 12 and 16 to be taken account of in a particularly efficient manner.

A precondition for taking into account the effect of the various illumination fields 110-1-110-3 typically is knowledge about the type and properties of the various beam shape properties 111-1-111-3. By way of example, the beam shape properties 111-1-111-3 may be determined and predetermined by the design of the microscopy device 500. However, it would also be possible to determine these within the scope of the calibration sequence.

In summary, techniques which facilitate the determination of a high-resolution result image from a plurality of low-resolution images of an object—to be precise, taking into account beam shape properties of the illumination fields assigned to the images—were illustrated above. Here, it may be possible to manipulate the beam shape properties in a targeted manner and/or to take into account beam shape properties due to the construction or otherwise fixedly predetermined beam shape properties. In particular, it is possible to take into account aberrations of the illumination device. As a result of the possibility of the subsequent correction of aberrations, it is possible, for example, to implement the illumination device and/or the detector of the microscopy device in a cost-effective manner or parameters may be optimized differently in the optics design. By way of example, a more cost-effective or robust illumination device and/or detector may be implemented. It may be the case that fewer adjustment steps are required for setting the microscopy device. By way of example, use may also be made, in particular, of microscopy devices which do not generate plane illumination waves. This may facilitate a simpler implementation of the illumination device. Furthermore, it may be possible, overall, to require a shorter time for carrying out the method steps which are required for determining the result image. That is to say, faster measurements may become possible by way of alternative measurement concepts. In particular, it may be possible, for example, to freely structure an overlap region between different illumination fields, for example by the targeted introduction of illumination aberrations or, in general, by the targeted modification of beam shape properties. Further, a comparatively simple combinability of existing illumination concepts and illumination devices may be possible. In particular, it may be unnecessary to configure the illumination device in such a way that it provides plane illumination waves. A homogeneous illumination of the object may be unnecessary. Therefore, the techniques discussed above may be combined, in particular, with any quasi-coherent illumination devices, in particular not only with Köhler illumination devices; furthermore, use may be made of critical illumination concepts. An accuracy in the reconstruction of the image of the object may be increased in relation to conventional Fourier ptychography. In particular, it may be possible for a quality of the result image to be increased in comparison with conventional Fourier ptychography. This may be achieved by virtue of various aberrations of the illumination device and/or of the detection device being correctable.

LIST OF REFERENCE SIGNS

S1-S4 Step
T1-T10 Step
100 Object
110-1-110-3 Illumination field
111-1-111-3 Beam shape property
120 Optical axis
201-1-201-3 Image
301 Approximation
302 Intermediate image
303 Result image
311 First resolution
312 Second resolution
500 Microscopy device
511 Illumination device
512 Detector
513 Sample holder
514 Computer unit
515 Memory
516 User interface

The invention claimed is:

1. A method for imaging an object using a microscopy device, wherein the method comprises:
obtaining at least two images of the object having a first resolution, respective ones of the at least two images having an assigned illumination field illuminating the object during image capture of the respective image and being associated with predetermined beam shape properties,
wherein the method comprises the following steps for an image evaluation of each one of the at least two images:
performing a first arithmetic operation to add an effect of the beam shape properties of the respectively assigned illumination field to a predetermined approximation of the object in the image space, wherein the predetermined approximation has a second resolution which is greater than the first resolution,
adapting the predetermined approximation in k-space by means of Fourier ptychography techniques on the basis of the respective image, and
performing a second arithmetic operation to remove the effect of the beam shape properties of the respective illumination field from the adapted approximation of the object in the image space in order to obtain an intermediate image, and
wherein the method furthermore comprises:
determining a result image on the basis of the intermediate images which are assigned to the at least two illumination fields.

2. The method as claimed in claim 1,
wherein the predetermined approximation which is used for the image evaluation of a first image of the object corresponds to the intermediate image which is obtained by the image evaluation of a second image of the object.

3. The method as claimed in claim 2,
wherein the steps for the image evaluation are repeated for the at least two images until a predetermined convergence criterion relating to the intermediate images is satisfied.

4. The method as claimed in claim 1,
wherein the Fourier ptychography techniques replace pixel values of the predetermined approximation in a specific region by pixel values of the respective image, wherein the specific region corresponds to a system pupil of the respective illumination field in k-space.

5. The method as claimed in claim 1,
wherein the beam shape properties are selected from the following group: a spatially dependent amplitude and/or phase of the illumination field; a shape of the aperture of an illumination device of the microscopy device; an illumination direction in respect of the object; an astigmatism; a curvature; a distortion.

6. The method as claimed in claim 5,
wherein the spatially dependent amplitude of the illumination field is described by a Gaussian function and/or wherein the spatially dependent amplitude of the illumination field is predetermined by a non-Köhler illumination device of the microscopy device and/or by the illumination device of the microscopy device with critical illumination.

7. The method as claimed in claim 5,
wherein the shape of the aperture is predetermined by a zoom device of the microscopy device for the at least two illumination fields.

8. The method as claimed in claim 4,
wherein the shape of the aperture is predetermined by a zoom device of the microscopy device for the at least two illumination fields,
wherein the shape of the aperture is predetermined dependent on illumination directions of the at least two illumination fields such that the system pupils of in each case two of the at least two illumination fields alternately overlap.

9. The method as claimed in claim 1, wherein at least some or all of the at least two illumination fields are associated with the same illumination directions which include a finite angle with the optical axis of the microscopy device.

10. The method as claimed in claim 1, wherein the method furthermore comprises:
carrying out a calibration sequence for determining the beam shape properties of the at least two illumination fields.

11. The method as claimed in claim 1, wherein the method comprises the following for each one of the at least two images:
illuminating the object with the respective illumination field by operating an illumination device of the microscopy device,
using a detector of the microscopy device to capture the respective image of the object during the illumination with the respective illumination field.

12. A microscopy device configured to image an object, wherein the microscopy device comprises:
a computer unit configured to obtain at least two images of the object having a first resolution, respective ones of the at least two images having an assigned illumination field illuminating the object during image capture of the respective image and being associated with predetermined beam shape properties, wherein, for image evaluation for each one of the at least two images, the computer unit is configured to:
perform a first arithmetic operation to add an effect of the beam shape properties of the respectively assigned illumination field to a predetermined approximation of the object in the image space, wherein the predetermined approximation has a second resolution which is greater than the first resolution,
adapt the predetermined approximation by means of Fourier ptychography techniques on the basis of the respective image, and
perform a second arithmetic operation to remove the effect of the beam shape properties of the respective illumination field from the adapted approximation of the object in the image space in order to obtain an intermediate image, and
wherein the computer unit is furthermore configured to determine a result image on the basis of the intermediate images which are assigned to the at least two illumination fields.

* * * * *